(12) United States Patent
Choi et al.

(10) Patent No.: US 11,843,782 B2
(45) Date of Patent: *Dec. 12, 2023

(54) SIGNALING OUTPUT PICTURE SIZE FOR REFERENCE PICTURE RESAMPLING

(71) Applicant: TENCENT AMERICA LLC, Palo Alto, CA (US)

(72) Inventors: Byeongdoo Choi, Palo Alto, CA (US); Stephan Wenger, Hillsborough, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,903

(22) Filed: Oct. 31, 2022

(65) Prior Publication Data

US 2023/0116623 A1 Apr. 13, 2023

Related U.S. Application Data

(63) Continuation of application No. 17/063,253, filed on Oct. 5, 2020, now Pat. No. 11,563,947.

(Continued)

(51) Int. Cl.
*H04N 19/132* (2014.01)
*H04N 19/172* (2014.01)
(Continued)

(52) U.S. Cl.
CPC ......... *H04N 19/132* (2014.11); *H04N 19/146* (2014.11); *H04N 19/172* (2014.11); *H04N 19/189* (2014.11)

(58) Field of Classification Search
CPC .... H04N 19/176; H04N 19/105; H04N 19/70; H04N 19/172; H04N 19/59;
(Continued)

(56) References Cited

U.S. PATENT DOCUMENTS

2009/0316775 A1 12/2009 Cheng
2010/0150231 A1 6/2010 Huang et al.
(Continued)

FOREIGN PATENT DOCUMENTS

| HU | E030338 T2 | 5/2017 |
| JP | 2019-525675 A | 9/2019 |
| WO | 2013/105946 A1 | 7/2013 |

OTHER PUBLICATIONS

Bross et al. "VersatileVideoCoding(Draft7)" JointVideoExpertsTeam(JVET)ofITU-TSG16WP3andISO/IECJTC1/SC29/WG1116th Meeting:Geneva,CH,Oct. 1-11, 2019,Document:JVET-P2001-vE,492 pages.*

(Continued)

*Primary Examiner* — Nathnael Aynalem
(74) *Attorney, Agent, or Firm* — Sughrue Mion, PLLC

(57) ABSTRACT

There is included a method and apparatus comprising computer code configured to cause a processor or processors to perform acquiring an input bitstream comprising metadata and video data, decoding the video data, determining whether the metadata comprises at least one flag signaling at least one component of a picture size of at least one picture of the video data, and signaling, in a case where it is determined that the metadata comprises the at least one flag, a display device to display the at least one picture from the video data according to the at least one flag.

18 Claims, 12 Drawing Sheets

Related U.S. Application Data

(60) Provisional application No. 62/955,514, filed on Dec. 31, 2019.

(51) Int. Cl.
  H04N 19/146 (2014.01)
  H04N 19/189 (2014.01)

(58) Field of Classification Search
  CPC ...... H04N 19/174; H04N 19/44; H04N 19/17; H04N 19/31; H04N 19/132; H04N 19/189; H04N 19/146; H04N 19/85
  USPC ...................................... 375/240.01–240.29
  See application file for complete search history.

(56) References Cited

U.S. PATENT DOCUMENTS

| | | | |
|---|---|---|---|
| 2012/0092453 | A1 | 4/2012 | Suh |
| 2014/0269912 | A1 | 9/2014 | Sullivan |
| 2015/0110203 | A1 | 4/2015 | Wang et al. |
| 2019/0141340 | A1* | 5/2019 | Reddiar ............... H04N 19/136 |
| 2021/0195172 | A1* | 6/2021 | Chang .................. H04N 19/176 |

OTHER PUBLICATIONS

Bross et al. "VersatileVideoCoding(Draft3)" JointVideoExpertsTeam(JVET)ofITU-TSG16WP3andISO/IECJTC1/SC29/WG112th Meeting:Macao,CN,Oct. 3-12, 2018,Document:JVET-L1001-v9, 235pages.*

Written Opinion dated Feb. 5, 2021 from the International Searching Authority in International Application No. PCT/US2020/059695.

Benjamin Bross, et al., "Versatile Video Coding (Draft 6)", Joint Video Experts Team (JVET) of ITU-T SG 16 WP 3 and ISO/IEC JTC 1/SC 29/WG 11, 15th Meeting: Gothenburg, SE, Jul. 3-12, 2019.

Vetro et al., "Overview of the Stereo and Multiview Video Coding Extensions of the H.264/MPEG-4 AVC Standard", Proceedings of the IEEE, Jan. 2011 (15 pages total).

Office Action dated Aug. 11, 2022 in Indian Application No. 202147047322.

International Search Report dated Feb. 5, 2021 from the International Searching Authority in International Application No. PCT/US2020/059695.

Bross et al. "Versatile Video Coding (Draft 7)" Joint Video Experts Team (JVET) of ITU-T SG 16 WP 3 and ISO/IEC JTC 1/SC 29/WG 11 16th Meeting: Geneva, CH, Oct. 1-11, 2019, Docuement: JVET-P2001-VE, 492 pages.

Seregin et al., "AHG8: Indication for output picture size", Joint Video Experts Team (JVET) of ITU-T SG 16 WP 3 and ISO/IEC JTC 1/SC 29/WG 11, JVET-Q0159, Brussels. BE, Jan. 7-17, 2020 (3 pages total).

Wang et al., "AHG9: Cleanups on parameter sets ", Joint Video Experts Team (JVET) of ITU-T SG 16 WP 3 and ISO/IEC JTC 1/SC 29/WG 11, JVET-Q0117-v1, Brussels. BE, Jan. 7-17, 2020 (10 pages total).

Office Action dated Oct. 25, 2022 from the Japanese Patent Office in JP Application No. 2021-559110.

* cited by examiner

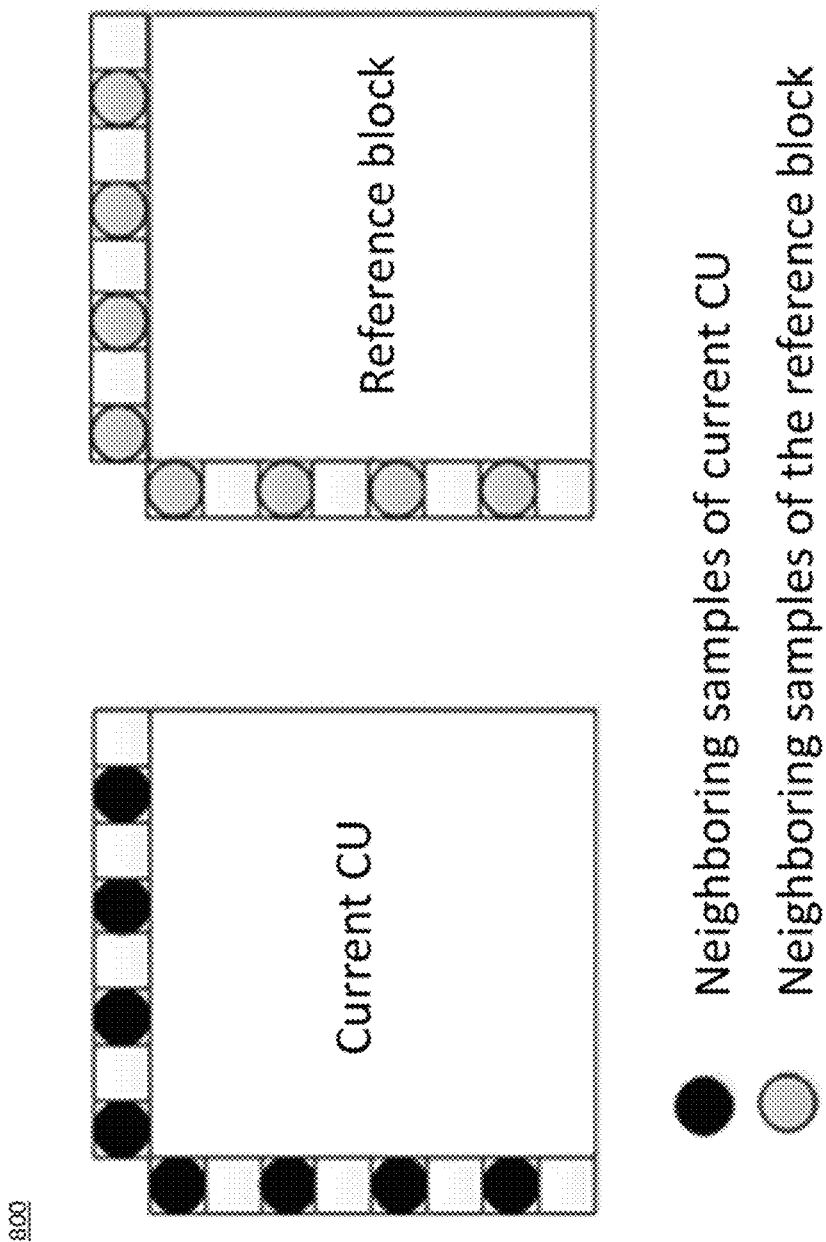

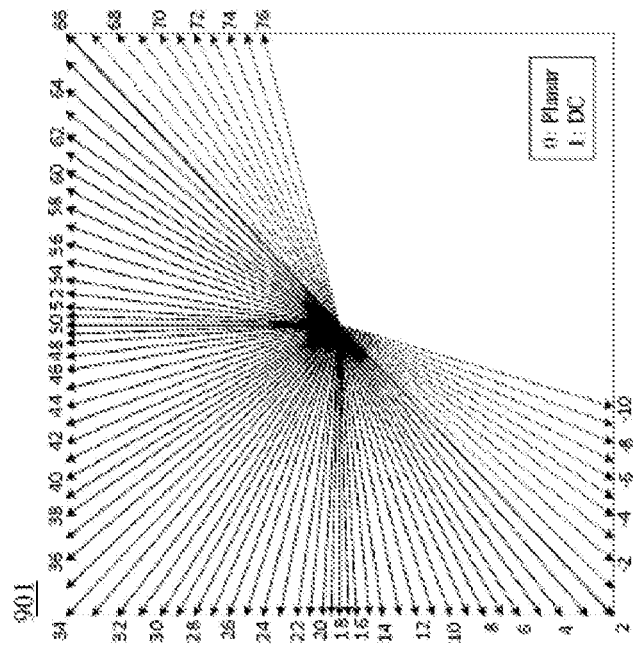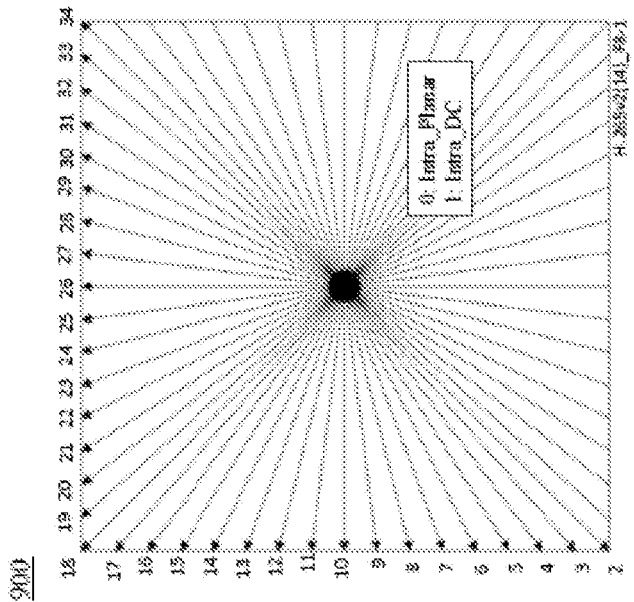

FIG. 11

| | Descriptor |
|---|---|
| vui_parameters( ) { | |
| ... | |
|   constant_output_pic_size_flag | u(1) |
|   if( constant_output_pic_size_flag ) { | |
|     guided_constant_output_pic_size_present_flag | u(1) |
|     if( guided_constant_output_pic_size_present_flag ) { | |
|       constant_output_pic_width_in_luma_samples | u(16) |
|       constant_output_pic_height_in_luma_samples | u(16) |
|     } | |
|   } | |
| ... | |
| } | |

1100

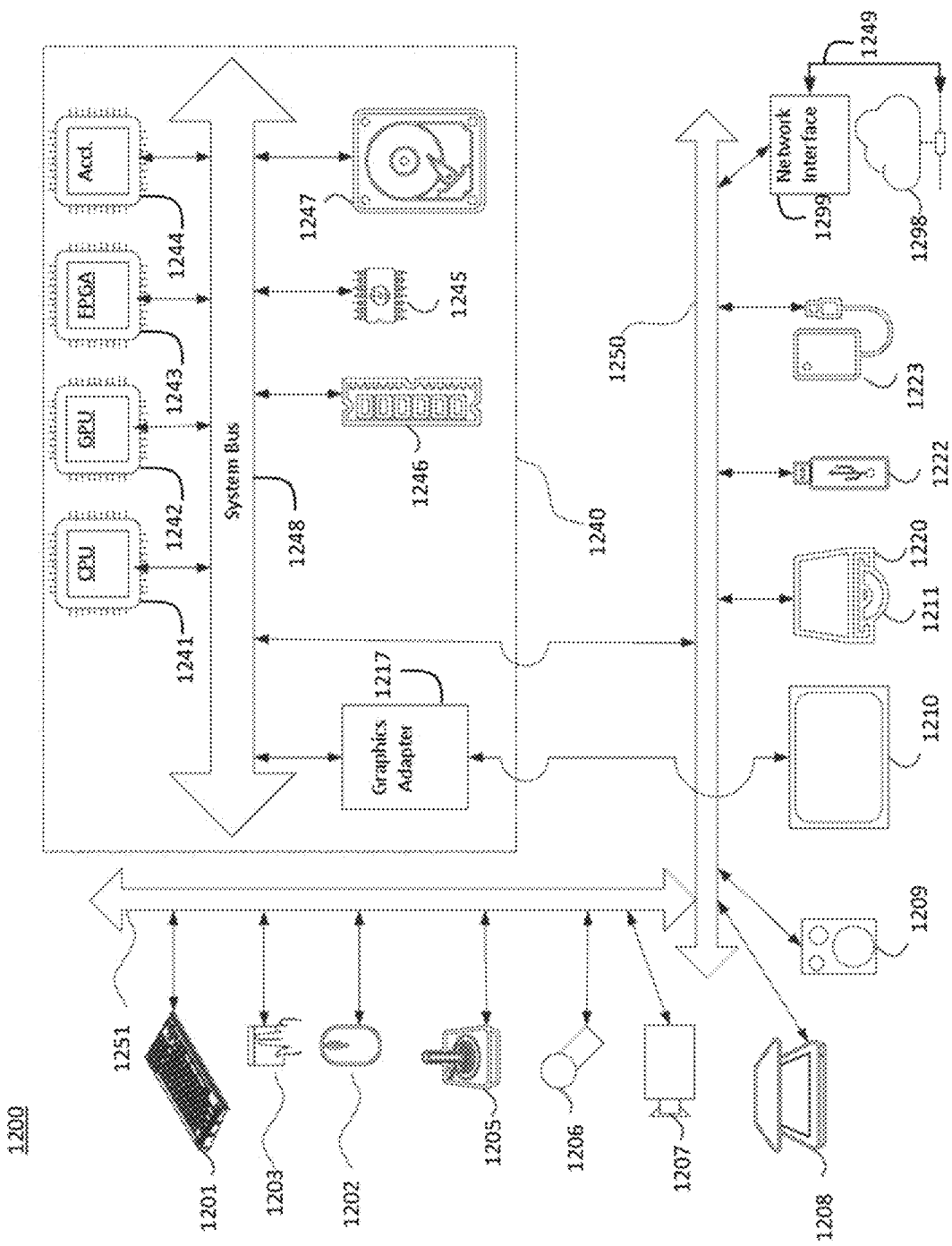

SIGNALING OUTPUT PICTURE SIZE FOR REFERENCE PICTURE RESAMPLING

CROSS REFERENCE TO RELATED APPLICATION

The present application is a Continuation Application of U.S. application Ser. No. 17/063,253 filed on Oct. 5, 2020, which claims priority to provisional application U.S. 62/955,514 filed on Dec. 31, 2019 which are hereby expressly incorporated by reference, in their entireties, into the present application.

BACKGROUND

1. Field

The present disclosure is directed to signaling constant picture size information, for example in video usage information (VUI), where according to exemplary embodiments, such information may indicate, among other information described herein, a guided output picture size for display, any of with and without one or more cropped output pictures having any of one or more different width and height values with respect to processing such as reference picture resampling (RPR).

2. Description of Related Art

In the versatile video coding (VVC) specification draft JVET-P2001 (editorially updated by JVET-Q0041), an RPR may enable a change of one or more decoded picture spatial resolutions. Depending on a picture width and height and cropping window offset values signaled in a picture parameter set (PPS), each output picture may have a different picture size than other output pictures. However, such features are disadvantageously dependent on requiring that a display device, as post processing for example, has a capability to rescale the output pictures to a constant picture size to be fit into the display device display resolution.

Such post processing has been disadvantageously purely the role of each display device and therefore limits, technically, capabilities for pre-processing control of output display, such as display device display resolution, at the display device. For example, in some content service scenarios, a content provider may be prevented, by technical limitations, from having provided video content consumed, or at least output, by a specific resolution, and further may even be prevented from even indicating the best or recommended resolution for display, in accordance with, for example, a director's intention.

Further, even JVET-N0052 rejected signaling the (constant) output picture size in SPS, to leave such process or processes, as a post processing, out of decoding process.

Therefore, there is a desire for a technical solution to such problems.

SUMMARY

To address one or more different requirements, which are carrying an intention, such as a director's intention, and leaving a freedom of a display for post processing, the inventors herein disclose technical solutions including signaling any of a constant output picture size in VUI, for example as an informative metadata. According to embodiments, an end user's device may still have a freedom to choose the display picture resolution, while also being able to accept a director's suggestion, optionally.

There is included a method and apparatus comprising memory configured to store computer program code and a processor or processors configured to access the computer program code and operate as instructed by the computer program code. The computer program code includes acquiring code configured to cause the at least one processor to acquire an input bitstream comprising metadata and video data, decoding code configured to cause the at least one processor to decode the video data, determining code configured to cause the at least one processor to determine whether the metadata comprises at least one flag signaling at least one component of a picture size of at least one picture of the video data, and signaling code configured to cause the at least one processor to signal, in a case where it is determined that the metadata comprises the at least one flag, a display device to display the at least one picture from the video data according to the at least one flag.

According to exemplary embodiments, the video data is encoded in a versatile video coding (VVC) format.

According to exemplary embodiments, the at least one flag specifies whether to display the at least one picture at the picture size according to a value of the component that is preset and indicated by the metadata.

According to exemplary embodiments, the component comprises at least one of a width and a height of the at least one picture.

According to exemplary embodiments, the at least one of the width and the height of the at least one picture comprises units of luma samples.

According to exemplary embodiments, the determining code is further configured to cause the at least one processor to determine, in response to determining that the metadata comprises the at least one flag, whether the metadata comprises a width value specifying the width with respect to a plurality of pictures, including the at least one picture, and whether the metadata comprises a height value specifying the height with respect to the plurality of pictures, and according to exemplary embodiments, at least one of the value of the component comprises at least one of the width and the height.

According to exemplary embodiments, the signaling code is further configured to cause the at least one processor to signal, in response to determining that the metadata comprises at least one of the width value and the height value, at least one post-resampling process to maintain the at least one of the width value and the height value for display of the at least one picture by the display device.

According to exemplary embodiments, the signaling code is further configured to cause the at least one processor to signal, in response to determining that the metadata is absent the width value, the at least one post-resampling process to maintain the width value at a height indicated by a sequence parameter set of the video data.

According to exemplary embodiments, the signaling code is further configured to cause the at least one processor to signal, in response to determining that the metadata is absent the height value, the at least one post-resampling process to maintain the height value at a height indicated by a sequence parameter set of the video data.

According to exemplary embodiments, the video data comprises the at least one flag as a video usage information (VUI) parameter.

BRIEF DESCRIPTION OF THE DRAWINGS

Further features, nature, and various advantages of the disclosed subject matter will be more apparent from the following detailed description and the accompanying drawings in which:

FIGS. 1-9B are schematic illustrations of diagrams in accordance with embodiments.

FIG. 11 is a simplified illustration in accordance with embodiments.

FIG. 12 is a schematic illustration of a diagram in accordance with embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
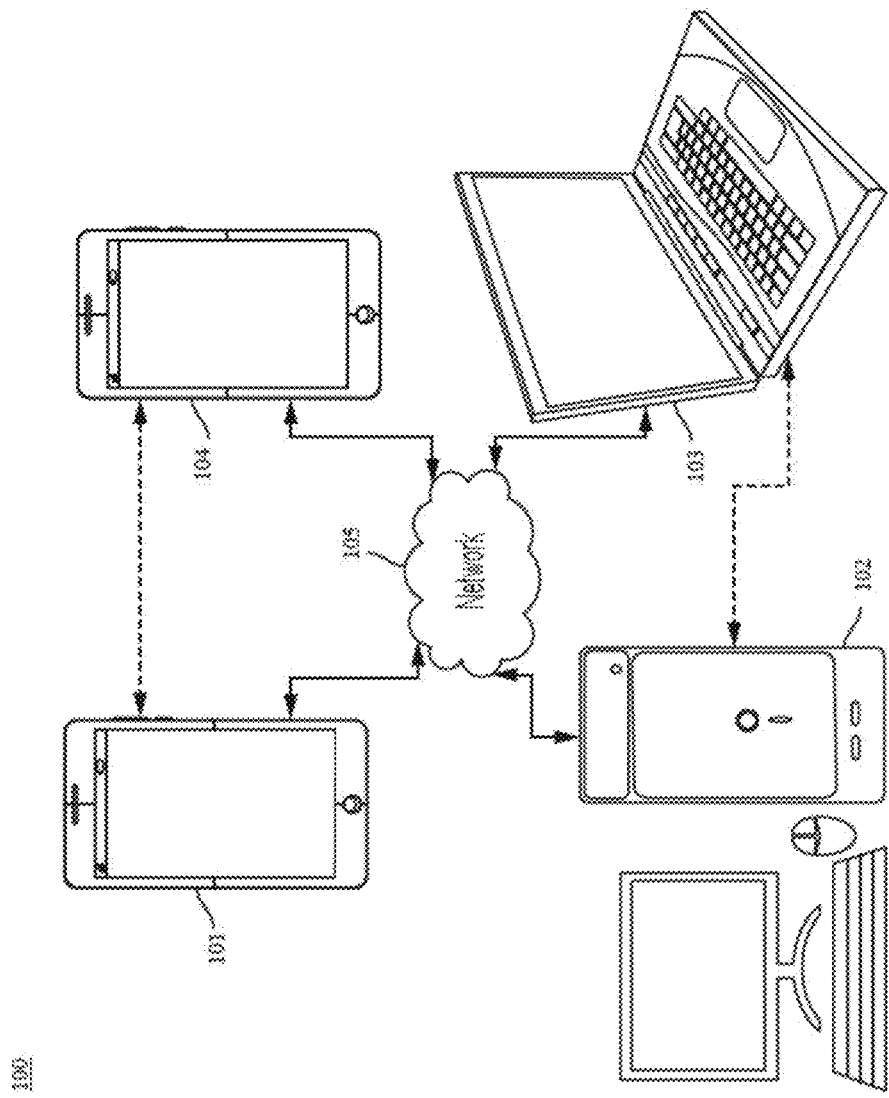

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
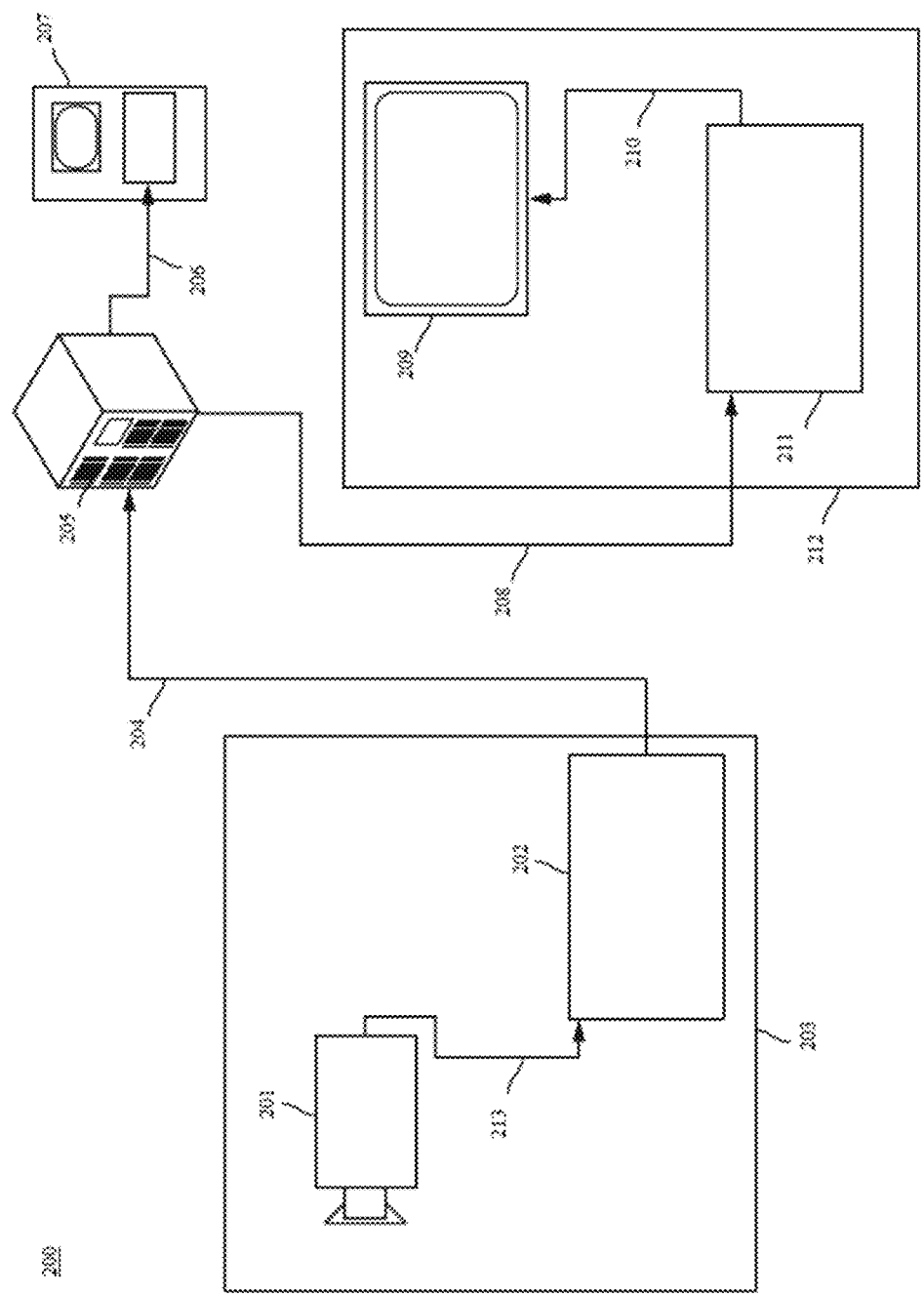

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
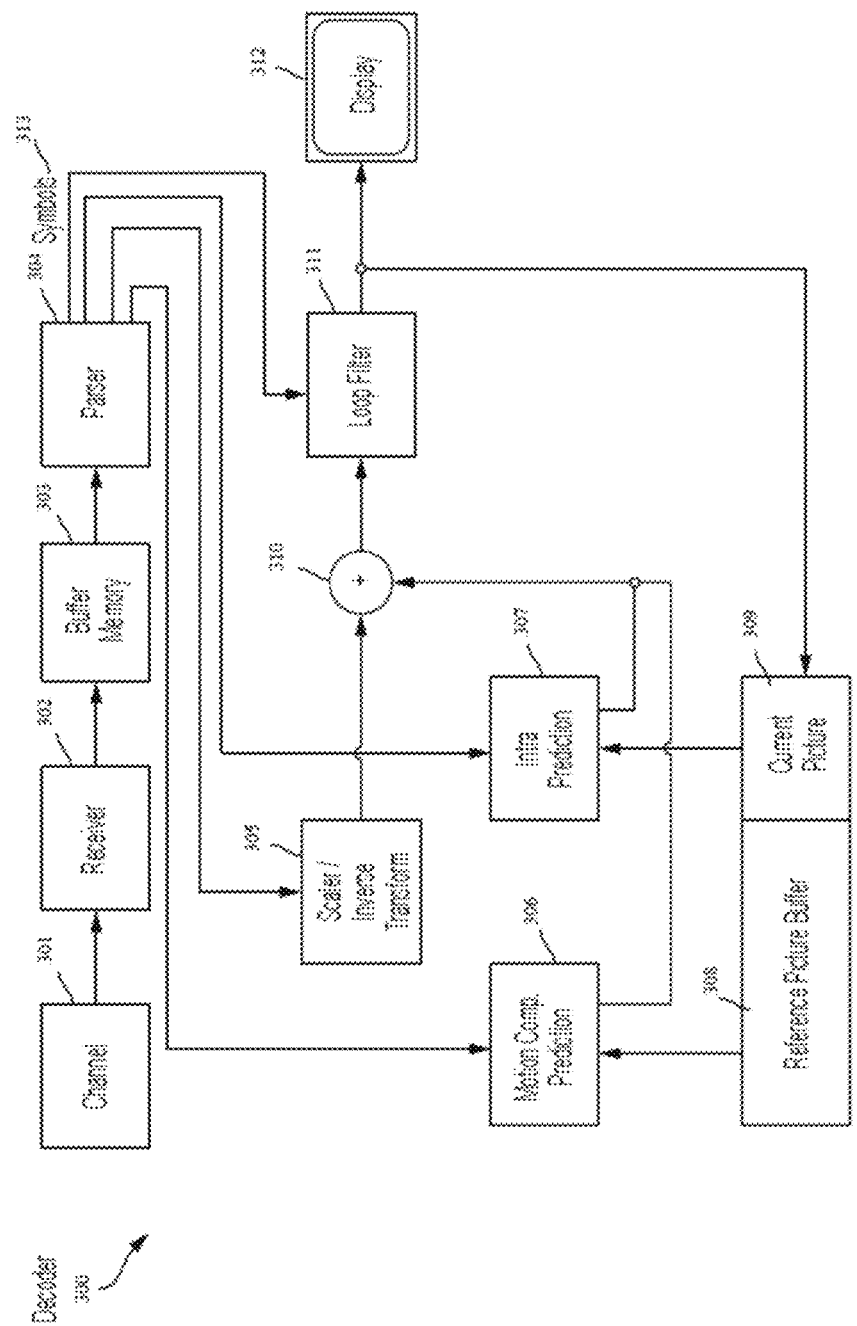

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
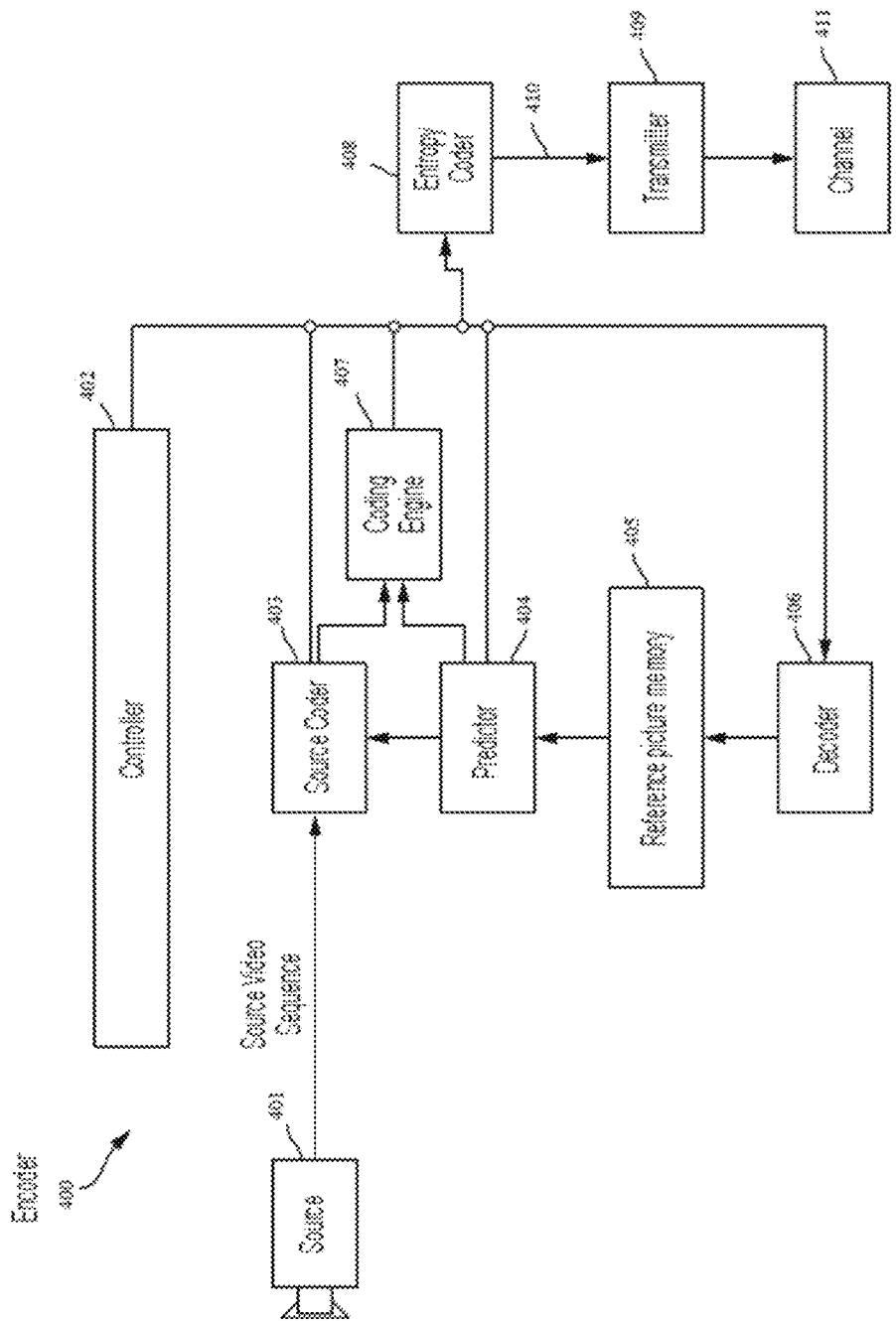

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
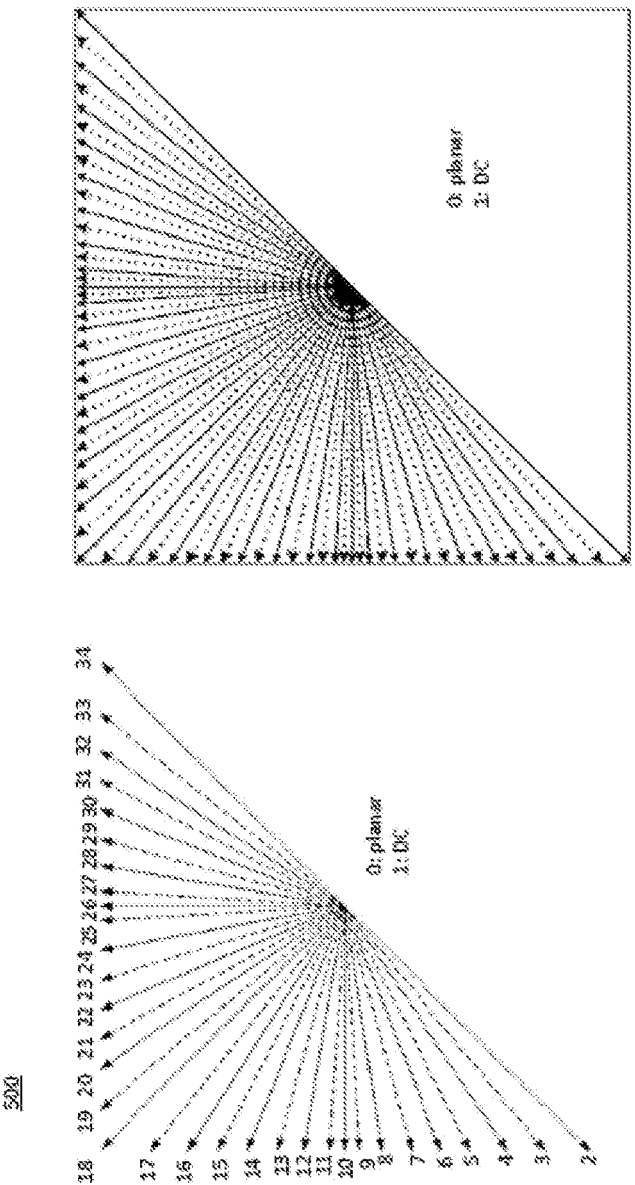

FIG. 5 illustrates intra prediction modes used in HEVC and JEM. To capture the arbitrary edge directions presented in natural video, the number of directional intra modes is extended from 33, as used in HEVC, to 65. The additional directional modes in JEM on top of HEVC are depicted as dotted arrows in FIG. 1 (*b*), and the planar and DC modes remain the same. These denser directional intra prediction modes apply for all block sizes and for both luma and chroma intra predictions. As shown in FIG. 5, the directional intra prediction modes as identified by dotted arrows, which is associated with an odd intra prediction mode index, are called odd intra prediction modes. The directional intra prediction modes as identified by solid arrows, which are associated with an even intra prediction mode index, are called even intra prediction modes. In this document, the directional intra prediction modes, as indicated by solid or dotted arrows in FIG. 5 are also referred as angular modes.

In JEM, a total of 67 intra prediction modes are used for luma intra prediction. To code an intra mode, an most probable mode (MPM) list of size 6 is built based on the intra modes of the neighboring blocks. If intra mode is not from the MPM list, a flag is signaled to indicate whether intra mode belongs to the selected modes. In JEM-3.0, there are 16 selected modes, which are chosen uniformly as every fourth angular mode. In JVET-D0114 and JVET-G0060, 16 secondary MPMs are derived to replace the uniformly selected modes.

Figure 6:
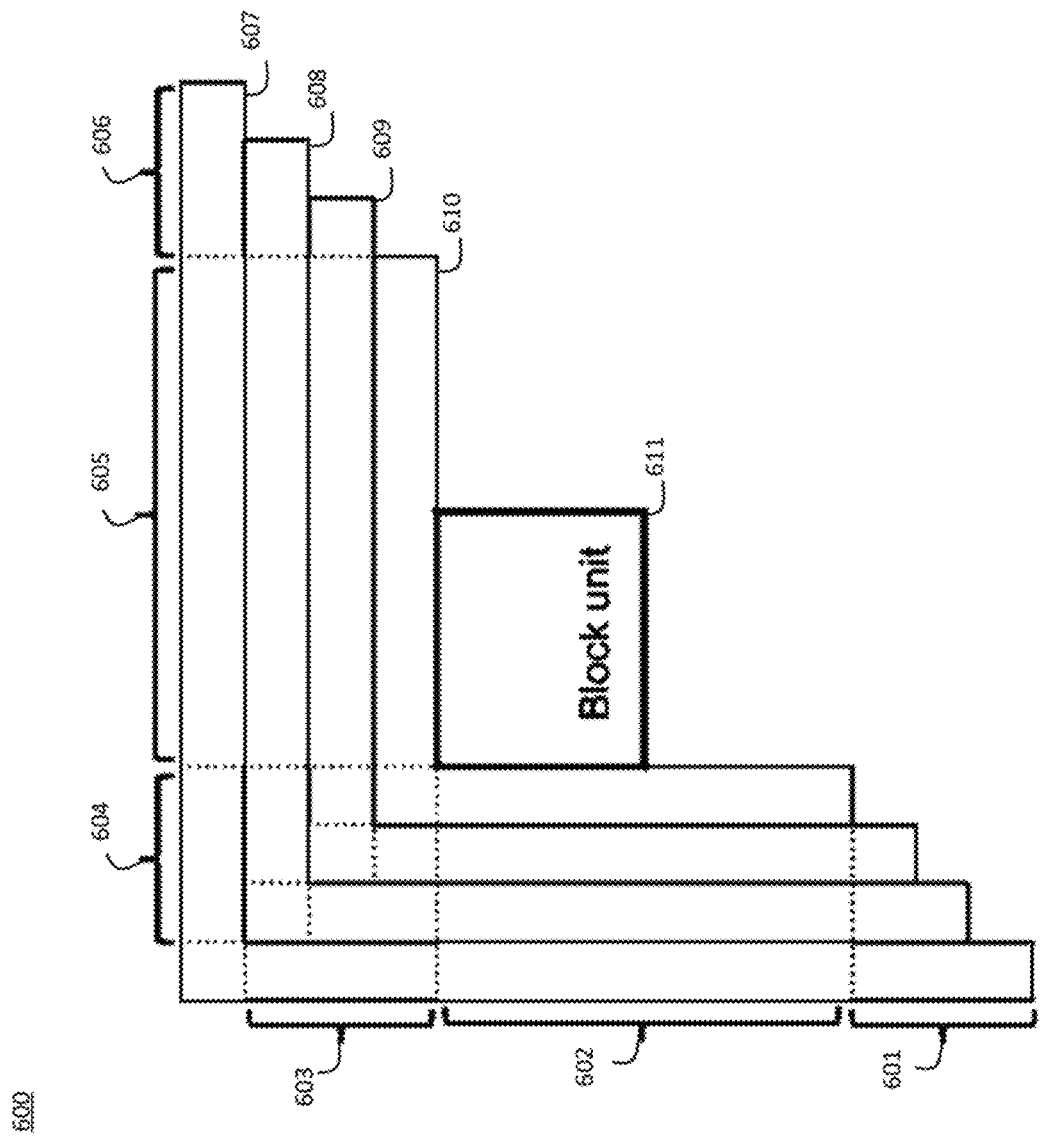

FIG. 6 illustrates N reference tiers exploited for intra directional modes. There is a block unit 611, a segment A 601, a segment B 602, a segment C 603, a segment D 604, a segment E 605, a segment F 606, a first reference tier 610, a second reference tier 609, a third reference tier 608 and a fourth reference tier 607.

In both HEVC and JEM, as well as some other standards such as H.264/AVC, the reference samples used for predicting the current block are restricted to a nearest reference line (row or column). In the method of multiple reference line intra prediction, the number of candidate reference lines (row or columns) are increased from one (i.e. the nearest) to N for the intra directional modes, where N is an integer greater than or equal to one. FIG. 2 takes 4×4 prediction unit (PU) as an example to show the concept of the multiple line intra directional prediction method. An intra-directional mode could arbitrarily choose one of N reference tiers to generate the predictors. In other words, the predictor p(x,y) is generated from one of the reference samples S1, S2, . . . , and SN. A flag is signaled to indicate which reference tier is chosen for an intra-directional mode. If N is set as 1, the intra directional prediction method is the same as the traditional method in JEM 2.0. In FIG. 6, the reference lines 610, 609, 608 and 607 are composed of six segments 601, 602, 603, 604, 605 and 606 together with the top-left reference sample. In this document, a reference tier is also called a reference line. The coordinate of the top-left pixel within current block unit is (0,0) and the top left pixel in the 1st reference line is (−1,−1).

In JEM, for the luma component, the neighboring samples used for intra prediction sample generations are filtered before the generation process. The filtering is controlled by the given intra prediction mode and transform block size. If the intra prediction mode is DC or the transform block size is equal to 4×4, neighboring samples are not filtered. If the distance between the given intra prediction mode and vertical mode (or horizontal mode) is larger than predefined threshold, the filtering process is enabled. For neighboring sample filtering, [1, 2, 1] filter and bi-linear filters are used.

A position dependent intra prediction combination (PDPC) method is an intra prediction method which invokes a combination of the un-filtered boundary reference samples and HEVC style intra prediction with filtered boundary reference samples. Each prediction sample pred[x][y] located at (x, y) is calculated as follows:

$$\text{pred}[x][y]=(wL*R_{-1,y}+wT*R_{x,-1}+wTL*R_{-1,-1}+(64-wL-wT-wTL)*\text{pred}[x][y]+32)>>6 \quad \text{(Eq. 2-1)}$$

where $R_{x,-1}$, $R_{-1,y}$ represent the unfiltered reference samples located at top and left of current sample (x, y), respectively, and $R_{-1,-1}$ represents the unfiltered reference sample located at the top-left corner of the current block. The weightings are calculated as below, $$wT=32>>((y<<1)>>\text{shift}) \quad \text{(Eq. 2-2)}$$

$$wL=32>>((x<<1)>>\text{shift}) \quad \text{(Eq. 2-3)}$$

$$wTL=-(wL>>4)-(wT>>4) \quad \text{(Eq. 2-4)}$$

$$\text{shift}=(\log 2(\text{width})+\log 2(\text{height})+2)>>2 \quad \text{(Eq. 2-5)}.$$

Figure 7:
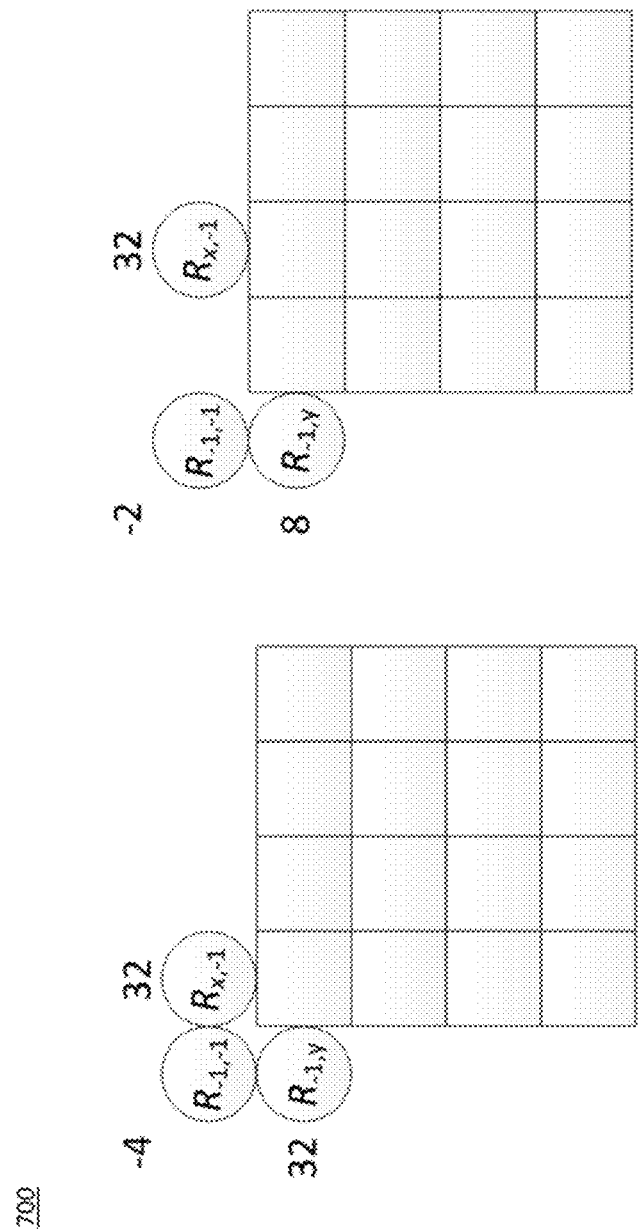

FIG. 7 illustrates a diagram 700 in which DC mode PDPC weights (wL, wT, wTL) for (0, 0) and (1, 0) positions inside one 4×4 block. If PDPC is applied to DC, planar, horizontal, and vertical intra modes, additional boundary filters are not needed, such as the HEVC DC mode boundary filter or horizontal/vertical mode edge filters. FIG. 7 illustrates the definition of reference samples Rx,−1, R−1,y and R−1,−1 for PDPC applied to the top-right diagonal mode. The prediction sample pred(x', y') is located at (x', y') within the prediction block. The coordinate x of the reference sample Rx,−1 is given by: x=x'+y'+1, and the coordinate y of the reference sample R−1,y is similarly given by: y=x'+y'+1.

FIG. 8 illustrates a Local Illumination Compensation (LIC) diagram 800 and is based on a linear model for illumination changes, using a scaling factor a and an offset b. And it is enabled or disabled adaptively for each inter-mode coded coding unit (CU).

When LIC applies for a CU, a least square error method is employed to derive the parameters a and b by using the neighboring samples of the current CU and their corresponding reference samples. More specifically, as illustrated in FIG. 8, the subsampled (2:1 subsampling) neighboring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

FIG. 9A illustrates intra prediction modes 900 used in HEVC. In HEVC, there are total 35 intra prediction modes, among which mode 10 is horizontal mode, mode 26 is vertical mode, and mode 2, mode 18 and mode 34 are diagonal modes. The intra prediction modes are signaled by three most probable modes (MPMs) and 32 remaining modes.

FIG. 9B illustrates, in embodiments of VVC, there are total 87 intra prediction modes where mode 18 is horizontal mode, mode 50 is vertical mode, and mode 2, mode 34 and mode 66 are diagonal modes. Modes −1∼−10 and Modes 67∼76 are called Wide-Angle Intra Prediction (WAIP) modes.

The prediction sample pred(x,y) located at position (x, y) is predicted using an intra prediction mode (DC, planar, angular) and a linear combination of reference samples according to the PDPC expression:

$$\text{pred}(x,y)=(wL \times R-1,y+wT \times Rx,-1-wTL \times R-1,-1+(64-wL-wT+wTL) \times \text{pred}(x,y)+32)>>6$$

where Rx,−1, R−1,y represent the reference samples located at the top and left of current sample (x, y), respectively, and R−1,−1 represents the reference sample located at the top-left corner of the current block.

For the DC mode the weights are calculated as follows for a block with dimensions width and height:

$$wT=32>>((y<<1)>>n\text{Scale}), wL=32>>((x<<1)>>n\text{Scale}), wTL=(wL>>4)+(wT>>4),$$

with nScale=(log 2(width)−2+log 2(height)−2+2)>>2, where wT denotes the weighting factor for the reference sample located in the above reference line with the same horizontal coordinate, wL denotes the weighting factor for the reference sample located in the left reference line with the same vertical coordinate, and wTL denotes the weighting factor for the top-left reference sample of the current block, nScale specifies how fast weighting factors decrease along the axis (wL decreasing from left to right or wT decreasing from top to bottom), namely weighting factor decrement rate, and it is the same along x-axis (from left to right) and y-axis (from top to bottom) in current design. And 32 denotes the initial weighting factors for the neighboring samples, and the initial weighting factor is also the top (left or top-left) weightings assigned to top-left sample in current CB, and the weighting factors of neighboring samples in PDPC process should be equal to or less than this initial weighting factor.

For planar mode wTL=0, while for horizontal mode wTL=wT and for vertical mode wTL=wL. The PDPC weights can be calculated with adds and shifts only. The value of pred(x,y) can be computed in a single step using Eq. 1.

Figure 10:
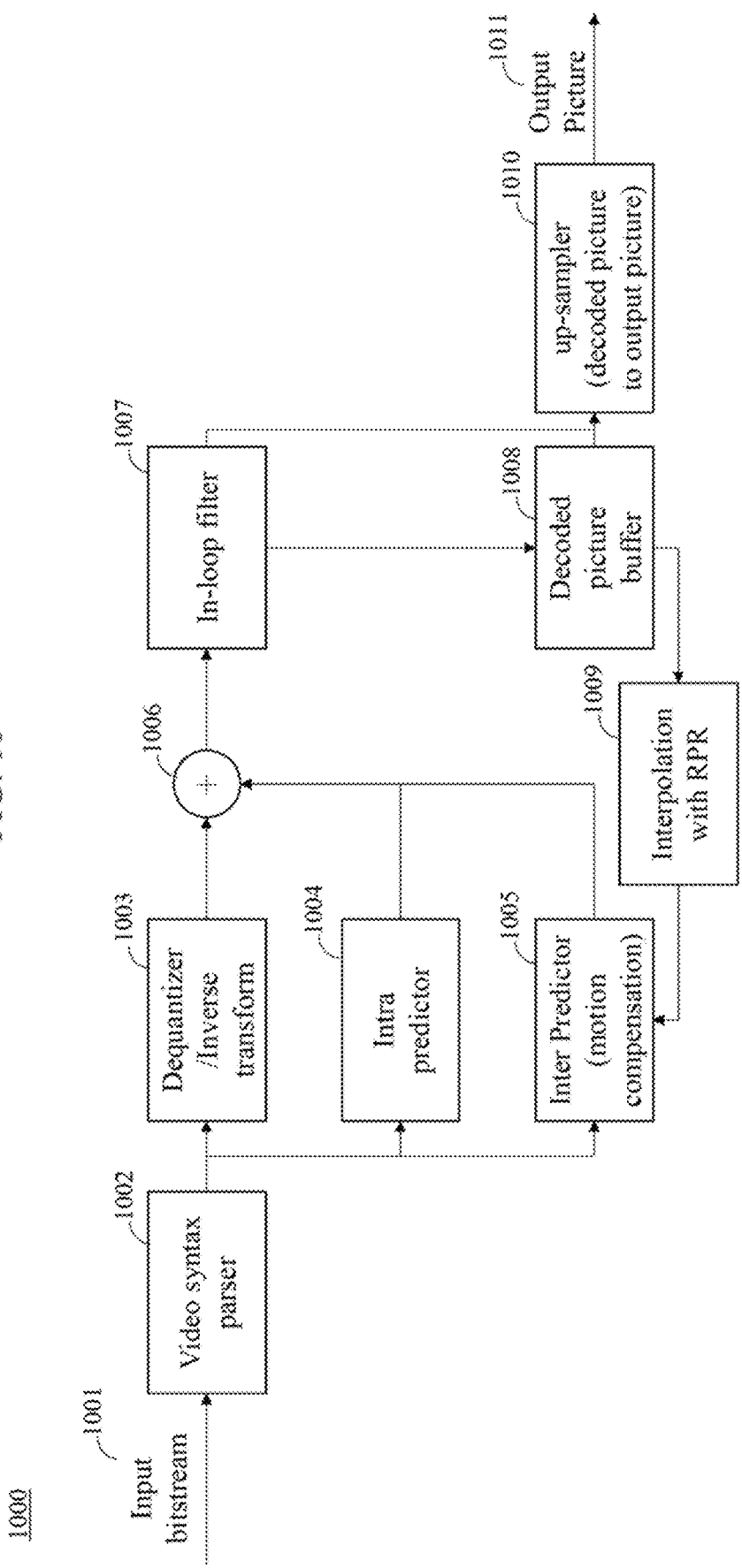
FIG. 10 is a simplified block diagram in accordance with embodiments.

FIG. 10 is a simplified block diagram 1000 in accordance with embodiments and shares additional context with respect to descriptions herein regarding FIG. 3. There is illustrated an input bitstream 1001 provided to a video syntax parser 1001 and an output picture 1011 with one or more display resolutions configured depending on various metadata included with, for example, the input bitstream 1001 and may be provided to one or more displays.

As with parser 304, described in further detail here, the video syntax parser 1002 provided processing, including handing of metadata, and provides similar information to one or more of the dequantizer/inverse-transform unit(s) 1003, the intra predictor unit(s) 1004, and the inter predictor (motion compensation) unit 1005 as similarly described with respective units of FIG. 3. The aggregator 1006 provides, according to exemplary embodiments, output samples that may be subject to various loop filtering techniques in the in-loop filter unit 1007 as with the loop filter 311 such as responsive to the metadata described above with respect to the input bitstream which may also be obtained during the decoding of one or more previous (in decoding order) parts of the coded picture or coded video sequence, as well as responsive to previously reconstructed and loop-filtered sample values.

Herein, an RPR may enable a change of decoded picture spatial resolutions picture-by-picture within a coded video sequence (CVS), and a decoded picture, such as stored in a decoded picture buffer (DPB) 1008, may be outputted for display via the up-sampler unit 1010 with respect to converting a decoded picture to an output picture.

FIG. 11 is a simplified illustration 1100 of VUI parameter syntax and such flags described herein may be included such VUI parameter. in accordance with embodiments and illustrates one or more algorithms with respect to considering exemplary embodiments of VUI parameters which may be used any of collectively and separately. One or more of such VUI parameters represents aspects of the metadata described above with respect to FIG. 10 enabling an addressing of one or more different requirements, which are carrying an intention, such as a director's intention, and leaving a freedom of a display for post processing, by signaling any of a constant output picture size in VUI, for example as an informative metadata. According to embodiments, an end user's device may still have a freedom to choose the display picture resolution, while also being able to accept a director's suggestion, optionally, as described herein.

For example, the illustration 1100 includes a constant_output_pic_size_flag, which, according to exemplary embodiment, when equal to 1 specifies that any post-resampling process is applied to each cropped output picture so that each resampled output picture shall have the constant picture size, specified by constant_output_pic_width_in_luma_samples and constant_output_pic_height_in_luma_samples. In contrast, according to embodiments, a constant_output_pic_size_flag equal to 0 specifies that a post-resampling process may or may not be applied to each cropped output picture.

Further, the illustration 1100 includes a guided_constant_output_pic_size_present_flag, which, when equal to 1 specifies that a both constant_output_pic_width_in_luma_samples and a constant_output_pic_height_in_luma_samples are present in this VUI. In contrast, according to embodiments, a guided_constant_output_pic_size_present_flag equal to 0 specifies that both or at least one of constant_output_pic_width_in_luma_samples and constant_output_pic_height_in_luma_samples are not present in this VUI.

Further, the illustration 1100 includes one or more constant_output_pic_width_in_luma_samples value which specifies the width of each output picture after a post-resampling process in units of luma samples. In contrast, when not present, the value of constant_output_pic_width_in_luma_samples is inferred to be equal to pic_width_max_in_luma_samples in a SPS.

Further, the illustration 110 includes one or more constant_output_pic_height_in_luma_samples value which specifies the height of each output picture after a post-resampling process in units of luma samples. In contrast, when not present, the value of constant_output_pic_height_in_luma_samples is inferred to be equal to pic_height_max_in_luma_samples in SPS.

Therefore, according to exemplary embodiments, there is determining, in response to determining that the metadata comprises the at least one flag, whether the metadata comprises a width value specifying the width with respect to a plurality of pictures, including the at least one picture, and whether the metadata comprises a height value specifying the height with respect to the plurality of pictures. Further, according to exemplary embodiments, there is signaling, in response to determining that the metadata comprises the at least one of the width value and the height value, at least one post-resampling process to maintain the at least one of the width value and the height value for display of the at least one picture by the display device described herein, and there is also signaling, in response to determining that the metadata is absent the width value and/or the height value, the at least one post-resampling process to maintain the one or more corresponding one of the absent width value and/or the height value at a width and/or a height respectively as indicated by a SPS of the video data.

According to exemplary embodiments, therefore, by inclusion of such metadata along with the processing described in FIG. 10, an output display, such as a resolution, may be controlled according to an intent transmitted along with the input bitstream 1001 as at least part of the metadata. Such control information may be included with the output picture 1011 as metadata and may direct a post-processing device to any of only display the output picture 1011 in an output display resolution as specified by the metadata as described when the flag values in FIG. 11 are present and positive, and to provide an option to the post-processing device to decide, such as via a user selection at the time of entry of the data or predetermined or default, to select between whether to output display resolution as specified by the metadata as described when the flag values in FIG. 11 and whether to otherwise output the display resolution as controlled by the post-processing of the output display device. As described herein, such indications may be provided by one or more flags included as metadata with at least the input bitstream 1001 and or the output picture 1011 output to a display device.

Accordingly, by exemplary embodiments described herein, the technical problems noted above may be advantageously improved upon by one or more of these technical solutions.

The techniques described above, can be implemented as computer software using computer-readable instructions and physically stored in one or more computer-readable media or by a specifically configured one or more hardware processors. For example, FIG. 12 shows a computer system 1200 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 12 for computer system 1200 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1200.

Computer system 1200 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1201, mouse 1202, trackpad 1203, touch screen 1210, joystick 1205, microphone 1206, scanner 1208, camera 1207.

Computer system 1200 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1210, or joystick 1205, but there can also be tactile feedback devices that do not serve as input devices), audio output devices (such as: speakers 1209, headphones (not depicted)), visual output devices (such as screens 1210 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1200 can also include human accessible storage devices and their associated media such as optical media including CD/DVD ROM/RW 1220 with CD/DVD 1211 or the like media, thumb-drive 1222, removable hard drive or solid state drive 1223, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1200 can also include interface 1299 to one or more communication networks 1298. Networks 1298 can for example be wireless, wireline, optical. Networks 1298 can further be local, wide-area, metropolitan, vehicular and industrial, real-time, delay-tolerant, and so on. Examples of networks 1298 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1298 commonly require external network interface adapters that attached to certain general-purpose data ports or peripheral buses (1250 and 1251) (such as, for example USB ports of the computer system 1200; others are commonly integrated into the core of the computer system 1200 by attachment to a system bus as described below (for example Ethernet interface into a PC computer system or cellular network interface into a smartphone computer system). Using any of these networks 1298, computer system 1200 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1240 of the computer system 1200.

The core 1240 can include one or more Central Processing Units (CPU) 1241, Graphics Processing Units (GPU) 1242, a graphics adapter 1217, specialized programmable processing units in the form of Field Programmable Gate Areas (FPGA) 1243, hardware accelerators for certain tasks 1244, and so forth. These devices, along with Read-only memory (ROM) 1245, Random-access memory 1246, internal mass storage such as internal non-user accessible hard drives, SSDs, and the like 1247, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 1251. Architectures for a peripheral bus include PCI, USB, and the like.

CPUs 1241, GPUs 1242, FPGAs 1243, and accelerators 1244 can execute certain instructions that, in combination, can make up the aforementioned computer code. That computer code can be stored in ROM 1245 or RAM 1246. Transitional data can be also be stored in RAM 1246, whereas permanent data can be stored for example, in the internal mass storage 1247. Fast storage and retrieval to any of the memory devices can be enabled through the use of cache memory, that can be closely associated with one or more CPU 1241, GPU 1242, mass storage 1247, ROM 1245, RAM 1246, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1200, and specifically the core 1240 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1240 that are of non-transitory nature, such as core-internal mass storage 1247 or ROM 1245. The software implementing various embodiments of the present disclosure can be stored in such devices and executed by core 1240. A computer-readable medium can include one or more memory devices or chips, according to particular needs. The software can cause the core 1240 and specifically the processors therein (including CPU, GPU, FPGA, and the like) to execute particular processes or particular parts of particular processes described herein, including defining data structures stored in RAM 1246 and modifying such data structures according to the processes defined by the software. In addition or as an alternative, the computer system can provide functionality as a result of logic hardwired or otherwise embodied in a circuit (for example: accelerator 1244), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video coding performed by at least one processor, the method comprising:
   acquiring metadata of video data;
   determining whether a component of the metadata comprises at least one flag signaling at least one component of a picture size of at least one picture of the video data; and
   determining, in response to determining that the component of the metadata comprises the at least one flag and based on the metadata specifying at least one of a width and a height with respect to a plurality of pictures, whether any post-resampling process is applied to each of a plurality of cropped output pictures such that each of a plurality of resampled output pictures is to have a constant picture size.

2. The method for video decoding according to claim 1, wherein the video data is in a versatile video coding (VVC) format.

3. The method for video decoding according to claim 2, wherein the component comprises at least one dimension of the at least one picture.

4. The method for video decoding according to claim 3, wherein the at least one dimension of the at least one picture comprises units of luma samples.

5. The method for video decoding according to claim 2, wherein the at least one flag specifies whether to display the at least one picture at the picture size according to a value of the component that is present and indicated by the metadata.

6. The method for video decoding according to claim 5, wherein said any post-resampling process is of cropped output pictures.

7. The method for video decoding according to claim 1, further comprising:
   signaling that said any post-resampling process is to maintain a width value at a value indicated by a sequence parameter set of the video data.

8. The method for video decoding according to claim 1, further comprising:
   signaling that said any post-resampling process to maintain a height value at a value indicated by a sequence parameter set of the video data.

9. The method for video decoding according to claim 1, further comprising:
   determining that each of the resampled output pictures is to have the constant picture size by checking the metadata for at least one flag of a video usage information (VUI) parameter.

10. An apparatus for video decoding, the apparatus comprising:
    at least one memory configured to store computer program code;
    at least one processor configured to access the computer program code and operate as instructed by the computer program code, the computer program code including:
       acquiring code configured to cause the at least one processor to acquire metadata of video data; and
       determining code configured to cause the at least one processor to determine whether a component of the metadata comprises at least one flag signaling at least one component of a picture size of at least one picture of the video data and to determine, in response to determining that the component of the metadata comprises the at least one flag and based on the metadata specifying at least one of a width and a height with respect to a plurality of pictures, whether any post-resampling process is applied to each of a plurality of cropped output pictures such that each of a plurality of resampled output pictures is to have a constant picture size.

11. The apparatus for video decoding according to claim 10, wherein the video data is in a versatile video coding (VVC) format.

12. The apparatus for video decoding according to claim 11, wherein the component comprises at least one dimension of the at least one picture.

13. The apparatus for video decoding according to claim 12, wherein the at least one dimension of the at least one picture comprises units of luma samples.

14. The apparatus for video decoding according to claim 11, wherein the at least one flag specifies whether to display the at least one picture at the picture size according to a value of the component that is present and indicated by the metadata.

15. The apparatus for video decoding according to claim 14, wherein said any post-resampling process is of cropped output pictures.

16. The apparatus for video decoding according to claim 10, wherein the computer code further includes signaling code configured to cause the at least one processor to signal that said any post-resampling process to maintain a width value at a value indicated by a sequence parameter set of the video data.

17. The apparatus for video decoding according to claim 10, wherein the computer code further includes signaling code configured to cause the at least one processor to signal that said any post-resampling process to maintain a height value at a value indicated by a sequence parameter set of the video data.

18. A non-transitory computer readable medium storing a program configured to cause a computer to:
    acquire metadata of video data;
    determine whether a component of the metadata comprises at least one flag signaling at least one component of a picture size of at least one picture of the video data; and
    determine, in response to determining that the component of the metadata comprises the at least one flag and based on the metadata specifying at least one of a width and a height with respect to a plurality of pictures, whether any post-resampling process is applied to each of a plurality of cropped output pictures such that each of a plurality of resampled output pictures is to have a constant picture size.

* * * * *